United States Patent [19]

Holbek

[11] 4,053,322

[45] Oct. 11, 1977

[54] METHOD OF PREPARING PRODUCTS COMPRISING MINERAL FIBRES AND A BINDER

[76] Inventor: Kjeld Holbek, Allerslev Huse, DK-4320 Lejre, Denmark

[21] Appl. No.: 490,851

[22] Filed: July 22, 1974

[30] Foreign Application Priority Data

July 26, 1973 United Kingdom .............. 35626/73

[51] Int. Cl.² ............................................. C04B 7/02
[52] U.S. Cl. ..................................... 106/99; 106/104; 106/109; 106/110; 65/3 R; 65/33; 264/109; 260/38; 260/40 R; 260/42.14
[58] Field of Search ................. 106/99, 109, 110, 104, 106/50; 65/3, 33; 260/42.14, 38, 40 R; 264/122, 109; 252/378 R

[56] References Cited

U.S. PATENT DOCUMENTS

| 217,205 | 7/1879 | Dreyer | 106/99 |
|---|---|---|---|
| 3,220,915 | 11/1965 | Shannon | 65/33 |
| 3,785,792 | 1/1974 | Plumat | 65/33 |
| 3,822,340 | 7/1974 | Eberl et al. | 423/555 |
| 3,861,425 | 1/1975 | Wolf | 106/99 |

FOREIGN PATENT DOCUMENTS

768,086 9/1967 Canada ............................. 65/33

*Primary Examiner*—Winston A. Douglas
*Assistant Examiner*—John P. Sheehan

[57] ABSTRACT

A method of preparing products comprising mineral fibres and a binder comprising the steps of admixing a noncured binder with mineral fibres which have been subjected to a heat treatment at a temperature of between 550° and 900° C to improve the chemical resistance of the fibres and to improve their distribution in the binder, and allowing the binder to cure.

7 Claims, No Drawings

METHOD OF PREPARING PRODUCTS COMPRISING MINERAL FIBRES AND A BINDER

BACKGROUND OF THE INVENTION

This invention relates to a method of preparing products comprising mineral fibres such as rock wool fibres, slag wool fibres and glass fibres, and a binder including inorganic binder such as cement, gypsum, fusible glasses and metals and organic thermoplastic and thermosetting binders. British patent specification No. 1,267,756 discloses a composition consisting of an intimate mixture of a hydraulic binder, such a cement and fibres, which composition will set to a solid product on the addition of water.

In order to obtain a fibre-reinforced product having physical properties superior to those of products containing no fibres, each fibre should be in intimate contact with and completely surrounded by the binder. Consequently, the fibres should be separated from one another and should be uniformly distributed in the binder used.

However, the prior art attempts to obtain a uniform mixture of fibres and binder, such as cement, have proved unsuccessful, because the fibres tend to form fibre lumps during the mixing operation.

The object of the invention is to provide a fibrereinforced product in which the fibres are uniformly distributed.

Another object of the invention is to provide a product which does not deteriorate as a result of chemical attack of the fibres.

A further object of the invention is to provide a product containing a high proportion of fibres.

A still further object of the invention is to provide a product in which a sufficient adhesion between the binder and the fibres is obtained.

These objects are achieved by the method of the invention, which method comprises the steps of admixing a noncured binder with mineral fibres which have been subjected to a heat treatment at a temperature of between 550° and 900° C, and in allowing the binder to cure.

SUMMARY OF THE INVENTION

The invention is based on the discovery that when treated to a temperature of between 550° and 900° C, mineral fibres undergo such changes that they separate from one another and become uniformly distributed in the binder during a simple mechanical mixing operation. Consequently, the product obtained by using such heat treated fibres have improved physical properties, especially with respect to tensile strength, bending strength and compression strength.

Furthermore, the heat treatment imparts to the fibres an increased chemical resistance. This is particularly pronounced when the fibres are heated to temperatures sufficiently high to effect crystallization or devitrification. Such improved resistance to chemical attack is particularly advantageous when the fibres are admixed with hydraulic binders, such as Portland cement, which has an alkaline reaction. Ordinary mineral fibres admixed with Portland cement may be attacked both during the mixing operation and at later stages, when the products are wetted with water.

The chemical resistance of the heat treated fibres may also be advantageous when using organic binders. Thus, in Novolac and polyvinyl chloride binders, the fibres are exposed to strongly acid environments.

By examination under microscope it has been found that the heat treated fibres have uneven surfaces, whereas the non-treated fibres have a smooth surface. It is assumed that this is the reason why the binder adheres better to the heat treated fibres than to the non-treated fibres.

The period during which the fibres are heated to a temperature of between 550° and 900° C vary with the composition of the fibres, but a period of up to 1 h will normally suffice.

When heated to a temperature of about 800° C rock wool fibres and slag wool fibres tend to crystallize or devitrify.

The heat treatment can be effected by reheating fully cooled fibres to a temperature within the above mentioned range. The heating period may be determined by means of a pre-established time temperature cure for the material used.

Alternatively, the cooling of newly produced fibres may be stopped within said temperature range for a shorter or longer time depending on the desired properties of the heat treated fibres.

As a result of the use of heat treated fibres, the ratio of fibres to binder may be increased to a level which hitherto has been unobtainable. Thus, the products prepared by the method of the invention may contain up to 50% by weight of fibres based on the weight of the binder.

In order to further increase the adhesion between the fibres and the binder, the heat treated fibres may be subjected to a chemical pretreatment. Examples of chemicals which may be used for said purpose are silan A 1100, berol 788 etc., which act as interface active agents or linkage agents.

The distribution of the fibres within the binder may also be further facilitated by incorporating a finely divided inorganic material, such as silica, in the mixture of fibres and binder.

Examples of suitable binders are cement, such as Portland cement, alumina cement and slag cement; gypsum and various organic binders such as polyester, polyvinyl chloride and phenolic resin binders.

DESCRIPTION OF THE PREFERRED EMBODIMENTS

The invention will now be described in further detail with reference to the following examples.

EXAMPLE 1

2000 g Portland cement and 500 g diabase fibres, which fibres had been heat-treated at a temperature of between 650° to 800° C so as to effect a clear crystallization were mixed with 700 g water, and the paste thus obtained was moulded to form test samples. The density of said samples after curing for 14 days under water was 2.12 g/cm$^3$. The bending strengh after storage for 4 weeks in water was 109.7 kp/cm$^2$, and the compression strength was 868 kp/cm$^2$.

EXAMPLE 2

2000 g Portland cement and 1000 g mineral fibres of the type described in Example 1 were mixed with 1000 g water, and the paste thus obtained were moulded so as to form test samples. The density of said samples was 2.0 g/cm$^3$, the bending strengh was 96.9 kp/cm$^2$, and the compression strength 668 kp/cm$^2$.

EXAMPLE 3

Rock wool fibres which had been heated to a temperature of between 650° and 800° C were mixed with gypsum and water. These components were used in the following amounts:

| | |
|---|---|
| Gypsum | 1000 g |
| Heat treated fibres | 250 g |
| Water | 600 g |

The mixture was moulded into test samples, and after curing and drying the strength of said samples were determined. The following results were obtained:

| | |
|---|---|
| Bending strength: | 37.6 kp/cm$^2$ |
| Compression strength: | 95.1 kp/cm$^2$ |

Similar test samples without fibres had the following strength properties:

| | |
|---|---|
| Bending strength: | 11.6 kp/cm$^2$ |
| Compression strength: | 53.1 kp/cm$^2$ |

I claim:

1. A method of preparing fiber reinforced articles which consist essentially of a matrix and mineral fibers distributed in the matrix, the method comprising the steps of heat treating a quantity of mineral fibers at a temperature of between 550° C and 900° C for a time sufficient to cause at least partial crystallization of the mineral fibers so that the surfaces thereof become uneven causing the mineral fibers to separate from each other, intimately mixing a major amount of a matrix material and a minor amount of the heat treated mineral fibers so that the separated mineral fibers are uniformly distributed throughout the matrix material, and causing the matrix material to set whereby the matrix material is bound securely to the individual separated heat treated mineral fibers producing articles of superior physical properties.

2. A method according to claim 1, wherein the fibers are heat treated at a temperature which is sufficiently high to effect at least a partial crystallization of the fibers.

3. A method according to claim 1, wherein the matrix material is selected from the group consisting of Portland cement, alumina cement, slag cement, gypsum, polyesters, polyvinyl chloride and phenolic resins.

4. A method according to claim 3, wherein the mineral fibers are selected from the group consisting of rock wool fibers, slag wool fibers, and glass fibers.

5. A method according to claim 1, wherein the articles consist essenially of a mixture of heat-treated rock wool fibers and Portland cement.

6. A method according to claim 1, wherein there is further included the step of incorporating a finely divided inorganic material into the intimate mixture to further facilitate distribution of the mineral fibers uniformly throughout the matrix material.

7. A method according to claim 6, wherein the finely divided inorganic material is silica.

* * * * *